(12) United States Patent
Kono (10) Patent No.: US 10,293,729 B2
(45) Date of Patent: May 21, 2019

(54) VIBRATION GENERATOR (71) Applicant: CLARION CO., LTD., Saitama-shi (JP)

(72) Inventor: Kenji Kono, Tokyo (JP)

(73) Assignee: CLARION CO., LTD., Saitama-Shi (JP)

( * ) Notice: Subject to any disclaimer, the term of this patent is extended or adjusted under 35 U.S.C. 154(b) by 0 days.

(21) Appl. No.: 15/736,757

(22) PCT Filed: Jul. 8, 2016

(86) PCT No.: PCT/JP2016/070234
§ 371 (c)(1),
(2) Date: Dec. 14, 2017

(87) PCT Pub. No.: WO2017/010415
PCT Pub. Date: Jan. 19, 2017

(65) Prior Publication Data
US 2018/0170228 A1 Jun. 21, 2018

(30) Foreign Application Priority Data
Jul. 10, 2015 (JP) .................................. 2015-138391

(51) Int. Cl.
*B60N 2/90* (2018.01)
*A47C 7/72* (2006.01)
*B06B 1/04* (2006.01)

(52) U.S. Cl.
CPC .................. *B60N 2/90* (2018.02); *A47C 7/72* (2013.01); *B06B 1/045* (2013.01); *B60N 2002/981* (2018.02)

(58) Field of Classification Search
None
See application file for complete search history.

(56) References Cited

U.S. PATENT DOCUMENTS 4,064,376 A * 12/1977 Yamada ............. A61H 23/0218
297/217.4
5,387,026 A 2/1995 Matsuhashi et al.
(Continued)

FOREIGN PATENT DOCUMENTS

| CN | 1167701 | 12/1997 |
| CN | 101243477 | 8/2008 |

(Continued)

OTHER PUBLICATIONS

English translation of the Written Opinion for corresponding International Application No. PCT/JP2016/070234, dated Jan. 16, 2018.
(Continued)

*Primary Examiner* — David E Allred
(74) *Attorney, Agent, or Firm* — Mori & Ward, LLP (57) ABSTRACT

Provided is a vibration generator that even if a vibration is generated in the seat surface of a seat, allows a seated person to easily feel the vibration. A vibration generator (1) includes a vibration transmission member (10) and an exciter (20). The vibration transmission member (10) is disposed in a seat surface (2a) of a seat (2) so as to extend in the horizontal direction of the seat surface (2a) and is able to transmit a vibration in the extending direction. The exciter (20) is able to transmit a vibration to the vibration transmission member (10) in the extending direction of the vibration transmission member (10).

5 Claims, 5 Drawing Sheets

(56) References Cited

U.S. PATENT DOCUMENTS

| | | | | |
|---|---|---|---|---|
| 5,535,853 A * | 7/1996 | Skalski | ................... | B66B 7/042 |
| | | | | 187/292 |
| 5,813,234 A * | 9/1998 | Wighard | ............... | F02G 1/0435 |
| | | | | 62/467 |
| 5,820,006 A * | 10/1998 | Turner | ................... | B26F 3/002 |
| | | | | 225/96 |
| 6,056,357 A | 5/2000 | Fukuoka | | |
| 2002/0114487 A1 * | 8/2002 | Maekawa | .............. | H04R 9/063 |
| | | | | 381/412 |
| 2006/0255920 A1 * | 11/2006 | Maeda | ................. | B60N 2/0232 |
| | | | | 340/407.1 |
| 2007/0241595 A1 * | 10/2007 | Nathan | .................... | B06B 3/00 |
| | | | | 297/217.3 |
| 2009/0099721 A1 | 4/2009 | Imai et al. | | |
| 2009/0227913 A1 * | 9/2009 | Moriyama | ............... | B60N 2/90 |
| | | | | 601/49 |
| 2015/0020308 A1 * | 1/2015 | Reichle | ................. | A47D 15/00 |
| | | | | 5/93.1 |
| 2015/0165969 A1 * | 6/2015 | Cha | ......................... | B60Q 9/00 |
| | | | | 310/68 R |
| 2017/0297463 A1 * | 10/2017 | Yoshikawa | ............ | B60N 2/448 |
| 2018/0289585 A1 * | 10/2018 | Murison | ................ | A61H 21/00 |

FOREIGN PATENT DOCUMENTS

| | | |
|---|---|---|
| CN | 201784492 U | 4/2011 |
| CN | 204444960 U | 7/2015 |
| JP | 61-85985 U | 6/1986 |
| JP | 06-113932 | 4/1994 |
| JP | 2009-120015 | 6/2009 |
| JP | 2009-255809 | 11/2009 |

OTHER PUBLICATIONS

International Search Report for corresponding International Application No. PCT/JP2016/070234, dated Sep. 27, 2016.
Chinese Office Action for corresponding CN Application No. 201680032551.3, dated Jan. 21, 2019.
Supplementary European Search Report for corresponding EP Application No. 16824395.4, dated Feb. 14, 2019.
European Search opinion for corresponding EP Application No. 16824395.4, dated Feb. 22, 2019.

* cited by examiner

VIBRATION GENERATOR

TECHNICAL FIELD

The present invention relates to a vibration generator and, more specifically, to a vibration generator that is disposed in the seat surface of a seat and is able to transmit a vibration to a seated person.

BACKGROUND ART

There have been proposed vehicle alarm devices that include vibrators installed in the seat surfaces of seats and give alarms to seated persons through vibrations of the vibrators (for example, see Patent Literature 1). The vibrator of such a vehicle alarm device is installed between the cushion of the seat surface and a seat skin so as to be in contact with the seat skin. By installing the vibrator between the cushion and the seat skin so as to be in contact with the seat skin, the vibrator contacts a seated person through the seat surface. Thus, a vibration can be transmitted to the seated person more efficiently.

Since an alarm is given to the seated person through the vibration of the vibrator, the seated person can be caused to feel the alarm through the vibration even if the seated person is driving the vehicle.

CITATION LIST

Patent Literature

PTL 1: Japanese Unexamined Patent Application Publication No. 2009-120015

SUMMARY OF INVENTION

Technical Problem

To allow the seated person to easily feel the vibration, the vibrator of the above vehicle alarm device is installed between the cushion and the seat skin so as to be in contact with the seat skin. For this reason, the sitting comfort may be impaired, or the seated person may have a strange feeling of sitting. Also, if the cushion of the seat is flattened due to a reduction in the elastic performance of the cushion, the intensity of the vibration felt by the seated person, the vibration occurrence position, or the like may significantly vary.

For these reasons, it has been proposed that a vibrator be installed in a cushion rather than between the cushion and a seat skin or in other places. By installing a vibrator in a cushion, it is possible to reduce the reduction in the sitting comfort or the strange feeling of sitting.

However, the installation of a vibrator in a cushion poses a problem that a vibration generated by the vibrator may be absorbed by the cushion, resulting in a reduction in the vibration transmission efficiency.

Specifically, if the vibrator of a vehicle alarm device is installed in the seat surface of a seat and a vibration is given to a seated person vertically, the seated person may be less likely to feel the vibration due to the vertical movement of the vehicle.

One conceivable method for giving a larger vibration to a seated person is to cause a vibrator to output a larger vibration. However, this method tends to upsize vibrators and may increase the weight.

The present invention has been made in view of the foregoing, and object thereof is to provide a vibration generator that even if a vibration is generated in the seat surface of a seat, allows a seated person to easily feel the vibration.

Solution to Problem

A vibration generator of one aspect of the present invention includes a vibration transmission member disposed in a seat surface of a seat so as to extend in a horizontal direction of the seat surface and configured to transmit a vibration in an extending direction of the vibration transmission member and an exciter configured to transmit a vibration to the vibration transmission member in the extending direction.

The vibration generator transmits the vibration of the exciter in the extending direction of the vibration transmission member extending in the horizontal direction of the seat surface. Thus, the vibration generator is able to transmit a vibration in the horizontal direction, which is not the vertical direction, in which the weight of a seated person is applied to the seat surface. Since the vibration can be transmitted in the direction different from the vertical direction, in which the cushion or the like of the seat surface is more likely to be expanded or contracted by a pressure, the vibration is less likely to be attenuated and the seated person is more likely to feel the vibration.

Also, by adjusting or setting the frequency of a vibration outputted by the exciter to the frequency at which the vibration transmission member is resonated, the frequency at which the seat surface having the vibration transmission member disposed therein or the entire seat is resonated, or the like, the vibration transmission member or entire seat can be caused to output a resonant vibration. Thus, the seated person can be caused to feel the vibration more effectively and reliably.

In the vibration generator, the vibration transmission member may be a bar-shaped body and may be disposed in the seat surface in such a manner that one end of the bar-shaped body is located at one of a front end or a rear end of the seat surface and in a position close to a side in a left-right direction of the seat surface and another end of the bar-shaped body is located at an end different from the one of the front end or the rear end of the seat surface at which the one end of the bar-shaped body is located and in a position closer to a center in the left-right direction than the position close to the side of the seat surface in which the one end of the bar-shaped body is located.

In the vibration generator, the vibration transmission member is a bar-shaped body. The bar-shaped body is disposed in the seat surface so as to extend from the position close to the side in the left-right direction, of the front end or rear end of the seat surface toward the position close to the center in the left-right direction, of the other end of the seat surface. This means that the vibration transmission member is disposed in the seat surface so as to cross a thigh of a seated person from the inside to outside of the thigh. By vibrating the vibration transmission member thus disposed, the seated person can be caused to feel the vibration in a wide range from a buttock to the back of the thigh. Also, the seated person can be caused to reliably feel the vibration.

In the vibration generator, the vibration transmission member may be a cylindrical bar-shaped body having an approximately circular sectional shape.

If the vibration transmission member has an approximately circular sectional shape, it does not include an angular portion that hits a buttock, thigh, or the like, unlike a vibration transmission member having a triangular, square, or like sectional shape. Thus, the sitting comfort of the seated person can be improved.

In the vibration generator, the vibration transmission member may be disposed in an elastic member disposed in the seat surface.

In the vibration generator according to the present invention, in the case of the vibration transmission member is disposed in the elastic member, the vibration of the vibration transmission member can be prevented from being transmitted through another member such as a seat frame and thus can be prevented from escaping.

Advantageous Effects of Invention

The vibration generator according to an embodiment of the present invention transmits the vibration of the exciter in the extending direction of the vibration transmission member extending in the horizontal direction of the seat surface. Thus, the vibration generator is able to transmit a vibration in the horizontal direction, which is not the vertical direction, in which the weight of a seated person is applied to the seat surface. Since the vibration can be transmitted in the direction different from the vertical direction, in which the cushion or the like of the seat surface is more likely to be expanded or contracted by a pressure, the vibration is less likely to be attenuated and the seated person is more likely to feel the vibration.

Also, by adjusting or setting the frequency of a vibration outputted by the exciter to the frequency at which the vibration transmission member is resonated, the frequency at which the seat surface having the vibration transmission member disposed therein or the entire seat is resonated, or the like, the vibration transmission member or entire seat can be caused to output a resonant vibration. Thus, the seated person can be caused to feel the vibration more effectively and reliably.

BRIEF DESCRIPTION OF DRAWINGS

FIGS. 1(a) and 1(b) show a schematic configuration of a vehicle seat provided with a vibration generator according to an embodiment, in which

DESCRIPTION OF EMBODIMENTS

Figure 1A:
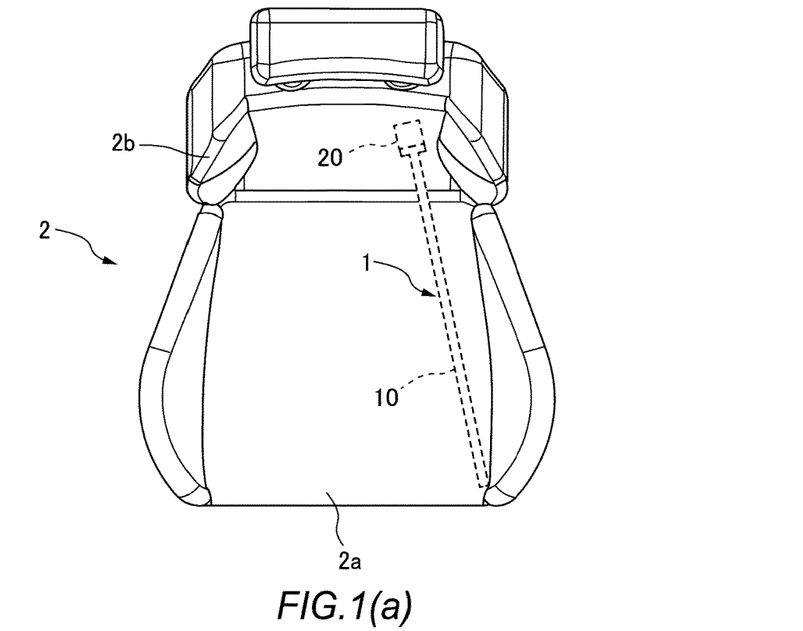
FIG. 1(a) shows a plan view of the seat.
Figure 1B:
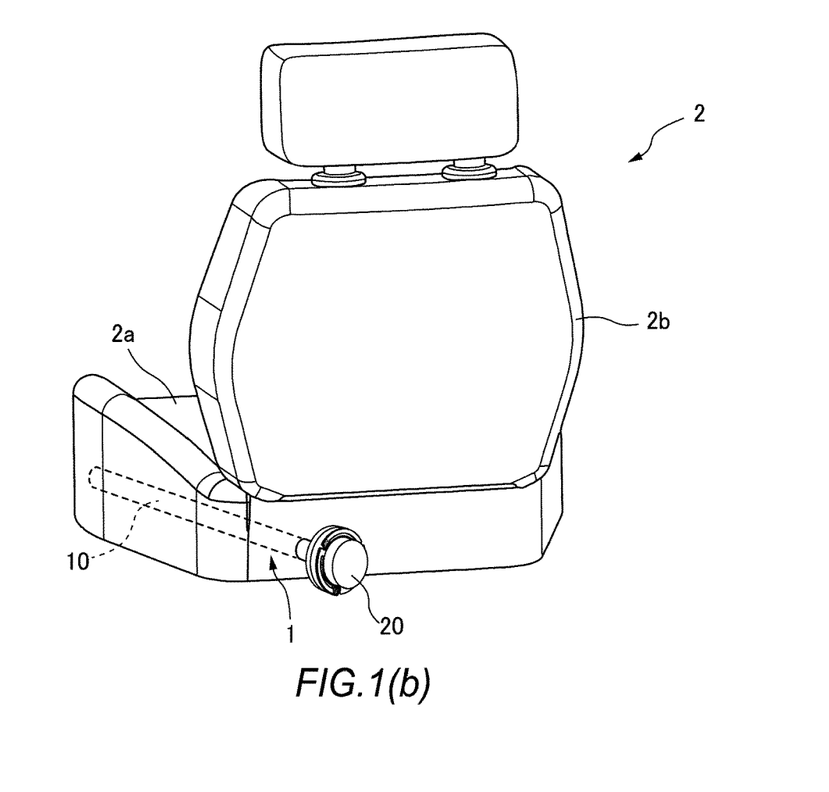
FIG. 1(b) shows a rear perspective view of the seat.
Figure 2:
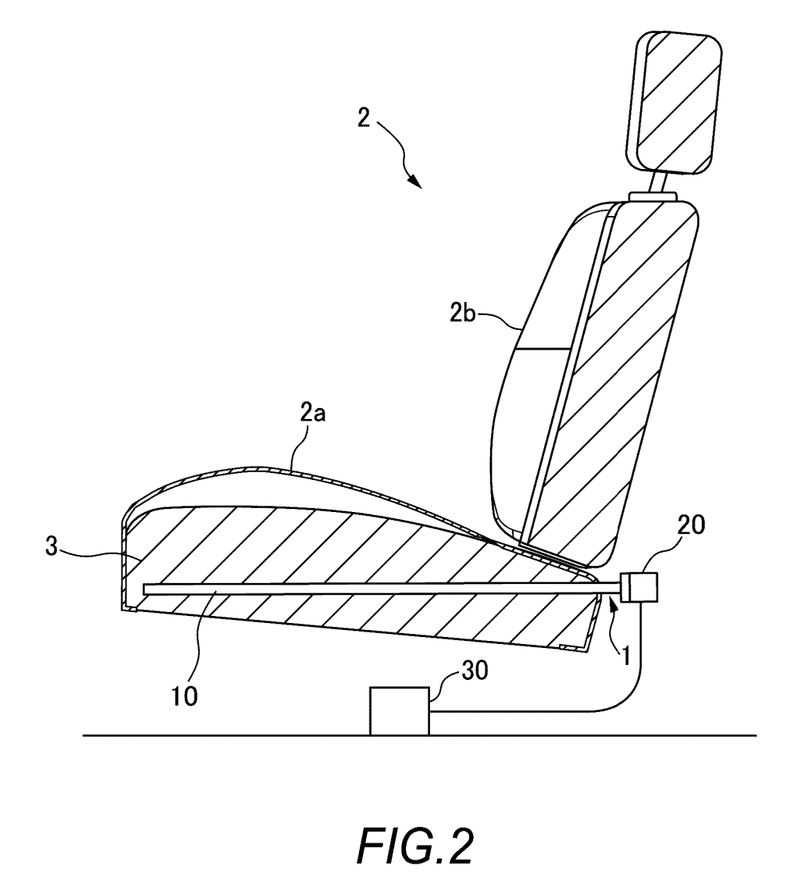
FIG. 2 is a side sectional view of the vehicle seat provided with the vibration generator according to the embodiment.

Now, an example of a vibration generator according to the present invention will be described in detail with reference to the drawings. FIGS. 1(a), 1(b), and 2 are drawings showing a schematic configuration of a vehicle seat 2 provided with a vibration generator 1 according to an embodiment. FIG. 1(a) shows a plan view of the seat, and FIG. 1(b) shows a rear perspective view of the seat. FIG. 2 shows a side sectional view of the seat.

As shown in FIGS. 1(a), 1(b), and 2, the vibration generator 1 roughly includes a vibration transmission member 10 and an exciter 20 and is disposed in a seat surface 2a of the vehicle seat 2. The vibration transmission member 10 is a cylindrical, bar-shaped member and is formed of a rigid body so that a vibration is easily transmitted thereby. For example, a metal such as iron is used as the vibration transmission member 10. However, the material of the vibration transmission member 10 is not limited to a metal and may be of any type as long as it easily transmits the vibration of the exciter 20.

Also, the vibration transmission member 10 need not be cylindrical, as long as it is a bar-shaped member. It preferably has a roughly circular sectional shape, but may have a polygonal sectional shape such as a triangular or rectangular one. Note that if the vibration transmission member 10 has a triangular, square, or any like sectional shape, care must be taken so that it does not affect the sitting comfort of the seated person. On the other hand, if it has a roughly circular sectional shape, it has no angular portion that hits a buttock, thigh, or the like. Thus, the sitting comfort or the like can be improved.

In the vehicle seat 2, a seat frame (not shown) forms a skeleton. The seat surface 2a and backrest 2b of the vehicle seat 2 are filled with an elastic member such as a cushion 3 for dispersing the pressure from the seated person (the weight of the seated person and the pressure applied to the backrest 2b), as well as for improving the sitting comfort or the like of the seated person.

The vibration transmission member 10 is disposed so as to be buried in the cushion 3 of the seat surface 2a. One specific method for burying the vibration transmission member 10 involves performing insert molding so that the cushion 3 is molded with the vibration transmission member 10 inserted. Another method involves forming an insertion hole for inserting the vibration transmission member 10 in a molded cushion 3, inserting the vibration transmission member 10 into the hole, and then fixing the vibration transmission member 10 to the cushion 3 using an adhesive or the like.

The vibration transmission member 10 is buried in the cushion 3. The vibration transmission member 10 is also disposed in the vehicle seat 2 so as not to contact a member, such as a seat frame, that easily transmits the vibration of the vibration transmission member 10 so that the vibration escapes. The vibration transmission member 10 may be provided with a lock configured to be caught on the cushion 3, a fold configured not to come out, or the like so as to prevent itself from coming out of the seat surface 2a due to the vibration.

As shown in FIGS. 1(a) and 1(b), the vibration transmission member 10 is disposed in the seat surface 2a in such a manner that the rear end thereof (the end on which the exciter 20 is mounted) is located in a position close to the center of the rear end of the seat surface 2a and the front end thereof is located near the left end (in a position close to the left side) of the front end of the seat surface 2a. Typically, angle adjustment mechanisms for adjusting the angle of the backrest 2b are disposed in left and right positions of the junction (a rear portion of the seat surface 2a) of the seat surface 2a and backrest 2b of the vehicle seat 2. For this reason, the rear end of the vibration transmission member 10 is preferably disposed in a position close to the center of the rear end of the seat surface 2a so that the rear end is avoided from being located in the disposition areas of the angle adjustment mechanisms in the seat surface 2a.

As described above, the vibration transmission member 10 is disposed in the seat surface 2a in such a manner that the rear end thereof is located in a position close to the center of the rear end of the seat surface 2*a* and the front end thereof is located near the left end (in a position close to the left side) of the front end of the seat surface 2*a*. By disposing the vibration transmission member 10 in the seat surface 2*a* in this manner, the vibration transmission member 10, which is a bar-shaped member, is disposed so as to cross a thigh of the seated person from the inside to outside thereof.

Preferably, the front end of the vibration transmission member 10 is located in a position as close as possible to the front of the seat surface 2*a* and as close as possible to the left side thereof while taking care so that the seated person does not have a strange feeling of sitting. By disposing the front end of the vibration transmission member 10 in a position as close as possible to the front of the seat surface 2*a* and as close as possible to the left side thereof, a vibration can be generated over a wide range. Thus, the seated person can be caused to feel the vibration in a wider range of his or her body.

While the single vibration transmission member 10 alone is shown in FIGS. 1(*a*), 1(*b*) and FIG. 2 for the convenience of description, a pair of vibration transmission members 10 may be disposed in the seat surface 2*a*. For example, a pair of vibration transmission members 10 are disposed in the seat surface 2*a* in such a manner that the rear ends of the vibration transmission members 10 are located in positions close to the center of the rear end of the seat surface 2*a* and the front ends of the vibration transmission member 10 are located near the left end (a position close to the left side) and the right end (a position close to the right side) of the front end of the seat surface 2*a*. By disposing the vibration transmission members 10 in the seat surface 2*a* in this manner, the vibration transmission members 10 can be disposed in an inverted v shape in a plan view of the seat surface 2*a*.

As shown in FIGS. 1(*a*), 1(*b*), and 2, the exciter 20 is mounted on the rear end of the vibration transmission member 10. More specifically, the exciter 20 is secured to the rear end of the vibration transmission member 10 with a frame 21 (see FIG. 3) of the exciter 20 brought into contact with the section of the rear end. The exciter 20 is also secured to the vibration transmission member 10 so as not to contact a member other than the vibration transmission member 10. By securing the exciter 20 to the vibration transmission member 10 in this manner, the vibration of the exciter 20 is prevented from being easily transmitted to a member other than the vibration transmission member 10, for example, the seat frame of the vehicle seat 2 and thus the vibration is prevented from escaping. The exciter 20 is a sound output device that is able to transmit a vibration force transmitted from a voice coil to an object in contact with the main body of the exciter and to cause the object to output a vibration and a sound.

Figure 3:
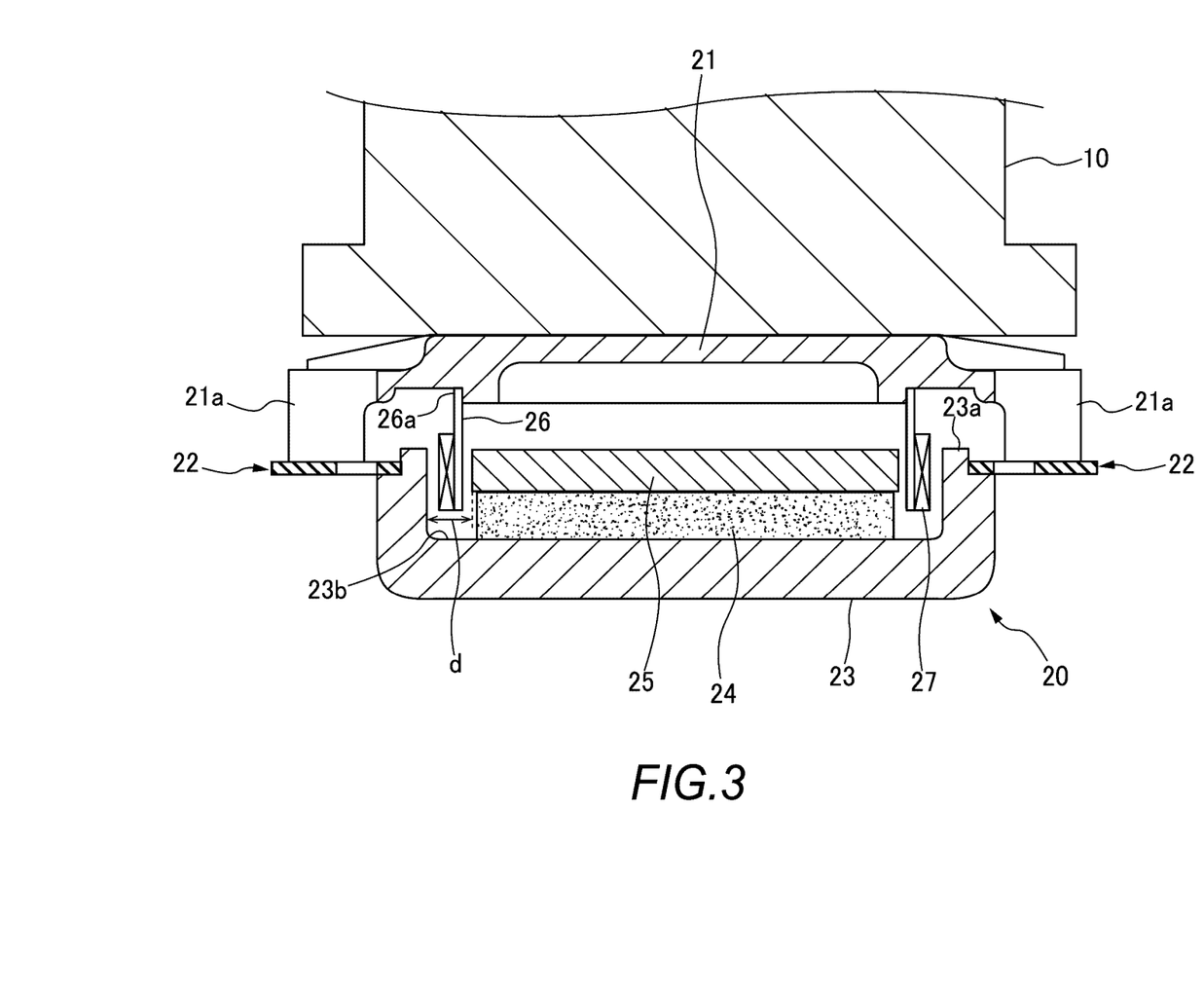
FIG. 3 is a sectional view showing a schematic configuration of an exciter according to the embodiment.

FIG. 3 is a sectional view showing a schematic structure of the exciter 20. FIG. 3 shows an aspect in which the exciter 20 is secured to the rear end of the vibration transmission member 10. The exciter 20 roughly includes the frame 21, multiple dampers 22, an outer yoke 23, a permanent magnet 24, an inner yoke 25, a bobbin 26, and a voice coil 27.

The outer yoke 23 consists of a sidewall 23*a* and a bottom 23*b* that are continuously formed, and is in a hollow shape. The permanent magnet 24 is mounted on the inside of the bottom 23*b* of the outer yoke 23 and is in the shape of a disc. The inner yoke 25 is placed on the permanent magnet 24. The inner yoke 25 is in the shape of a disc. The inner yoke 25 has a slightly larger diameter than the permanent magnet 24.

A clearance d is provided between the inner surface of the sidewall 23*a* of the outer yoke 23 and the circumferential surface of the inner yoke 25. One end of the cylindrical bobbin 26 is located in the clearance d. A voice coil 27 is wound about the one end of the bobbin 26.

The frame 21 has a pan shape having a larger diameter than the outer diameter of the outer yoke 23 so that it can cover the hollow shape of the outer yoke 23. Formed on the outer edge of the frame 21 is a leg 21*a* protruding toward the outer yoke 23. The side opposite to the side from which the leg 21*a* protrudes, of the pan-shaped frame 21 is secured to the section of the rear end of the vibration transmission member 10.

The base 26*a* of the bobbin 26 is secured to the side opposite to the side secured to the section of the vibration transmission member 10, of the pan-shaped frame 21. The dampers 22 are disposed at equal intervals on the leg 21*a* of the frame 21 so as to extend approximately helically in the circumferential direction of the frame 21. One ends (the center-side helical ends) of the dampers 22 are fixed to the periphery of the sidewall 23*a* of the outer yoke 23.

When a sound generator 30 shown in FIG. 2 provides a sound signal to the voice coil 27 of the exciter 20 thus configured, the bobbin 26 vibrates in accordance with the frequency of the sound signal. More specifically, the bobbin 26 vibrates in the direction in which the outer yoke 23 approaches or leaves the frame 21 (in the vertical direction of FIG. 3) through the dampers 22. The vibration of the bobbin 26 is transmitted to the vibration transmission member 10 through the frame 21. The vibration is applied to the vibration transmission member 10 in the extending direction of the vibration transmission member 10, which is a bar-shaped member. By causing the exciter 20 to transmit the vibration to the vibration transmission member 10 in the extending direction of the vibration transmission member 10, the vibration can be transmitted in the front-back direction of the vehicle seat 2.

Also, by changing or adjusting the frequency of a sound signal inputted to the exciter 20, the vibration transmission member 10 can be caused to transmit a vibration in the front-back direction. This vibration in the front-back direction can cause resonance in the vibration transmission member 10. By causing resonance in the vibration transmission member 10, the entire vibration transmission member 10 can be vibrated. Thus, the vibration can be transmitted not only in the extending direction of the vibration transmission member 10 but also over the entire vehicle seat 2.

The vibration transmission member 10, which is a bar-shaped member, is disposed in the seat surface 2*a* so as to cross a thigh of the seated person from the inside to outside of the thigh. Thus, by resonating the vibration transmission member 10, a wide range from a buttock to the back of the thigh can be caused to feel the vibration. Also, the seated person can be caused to reliably feel the vibration.

The vibration transmission member 10 is a bar-shaped member. By inputting a vibration generated by the exciter 20 to the bar-shaped member in the extending direction of the bar-shaped member, the entire vibration transmission member 10 can be vibrated. If the vibration transmission member 10 has, for example, a significantly curved shape, a vibration in the extending direction would be attenuated in the curved portion. Consequently, the vibration would be attenuated at the front end or the like of the vibration transmission member 10. That is, the entire vibration transmission member 10 would be difficult to vibrate. In the case of the vibration transmission member 10 according to the present embodiment, a vibration generated by the exciter 20 is inputted to the bar-shaped member in the extending direction thereof. The vibration in the extending direction significantly propagates through the bar-shaped member in the front-back direction. Accordingly, the vibration is less likely to be blocked.

In the present embodiment, a vibration generated by the exciter 20 is transmitted in the extending direction of the vibration transmission member 10 and in the front-back direction of the seat surface 2a. Thus, the vibration can be transmitted to a wide range compared to when the exciter is installed in the seat surface 2a with the exciter directed in the upward direction of the seat surface so as to transmit a vibration in the vertical direction of the seat. Also, the vibration can be transmitted in directions different from the vertical direction, in which the cushion or the like of the seat surface 2a is more likely to be expanded or contracted by a pressure. This can make the vibration less likely to be attenuated due to the compression of the cushion or the like, as well as can make the seated person more likely to feel the vibration.

The vehicle seat 2 is more likely to move vertically while the vehicle travels. For this reason, if the exciter 20 is installed in the seat surface 2a with the exciter directed in the upward direction of the seat surface, the dampers 22 of the exciter 20 may be vibrated in the vertical direction, which is the same direction as a vibration generated by the exciter 20. Vertical vibrations of the vehicle may damage the exciter 20 or reduce the performance thereof. In the case of the vibration transmission member 10 according to the present embodiment, the exciter 20 is being mounted on the vibration transmission member 10, dampers 22 of the exciter 20 vibrate in the front-back direction of the seat surface 2a. Thus, the influence of the vertical vibration of the vehicle can be reduced.

Also, the exciter 20 is disposed on the rear end of the vibration transmission member 10 so as not to contact the seat surface 2a or the like of the vehicle seat 2. Thus, the vibration of the exciter 20 can be transmitted directly to the vibration transmission member 10. Further, the reduction in the vibration caused by the contact between any other member in the vehicle seat 2 and the exciter 20 can be minimized.

Also, by changing or adjusting the frequency of a sound signal inputted to the exciter 20, not only the vibration transmission member 10 but also the vehicle seat 2 and seat surface 2a can be resonated. The performance of the cushion of the vehicle seat 2 deteriorates with time due to the sitting of persons on the vehicle seat 2, or the like. For this reason, the resonant frequency of the vehicle seat 2 and seat surface 2a is more likely to vary with time. However, the vehicle seat 2 and seat surface 2a can be resonated by changing or adjusting the frequency of a sound signal inputted to the exciter 20. As a result, it is possible to more effectively generate a vibration in accordance with the state of the vehicle seat 2 and seat surface 2a to enhance the vibration feeling performance of the seated person.

The vibration generator 1 of the present embodiment causes the exciter 20 to output a vibration to the vibration transmission member 10. The vibration generator 1 thus configured can cause the exciter 20 to output not only a vibration but also music or the like to the vibration transmission member 10 by changing or adjusting the frequency or the like of a sound signal inputted to the exciter 20. Thus, the vibration generator 1 can be used as a sound device that outputs not only vibrations but also sounds.

While the example of the vibration generator of the present invention has been described in detail with reference to the drawings, the vibration generator of the present invention is not limited to the example described in the embodiment. It is apparent that those skilled in the art can conceive of various changes or modifications thereto without departing from the scope set forth in the claims. Such changes or modifications can produce effects similar to those of the vibration generator 1 according to the embodiment.

For example, in the above description, the vibration transmission member 10 of the vibration generator 1 according to the embodiment is disposed in the seat surface 2a in such a manner that the rear end thereof is located in a position close to the center of the rear end of the seat surface 2a and the front end thereof is located near the left end (a position close to the left side) of the front end of the seat surface 2a, as shown in FIGS. 1(a), 1(b) and FIG. 2. However, the vibration generator 1 need not be disposed in the position shown in FIGS. 1(a), 1(b) and FIG. 2.

Figure 4A:
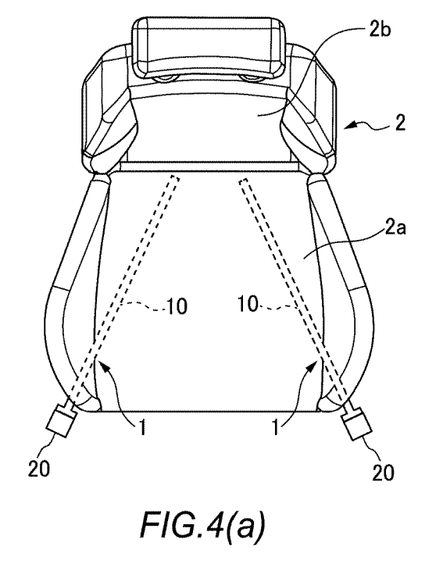
FIGS. 4(a), 4(b), and 4(c) show other examples in which the vibration generator according to the embodiment is disposed in the seat surface of the vehicle seat.

For example, as shown in FIG. 4(a), the vibration transmission member 10 may be disposed in the seat surface 2a in such a manner that the rear end thereof (the end on which the exciter 20 is mounted) is located near the left end (or near the right end) of the front end of the seat surface 2a and the front end thereof is located in a position close to the center in the left-right direction of the rear end of the seat surface 2a. In this case, the vibration transmission member 10 is buried in the cushion of the seat surface 2a in a state in which the exciter 20 secured to the rear end of the vibration transmission member 10 is located in front of the vehicle seat 2 and the front end of the vibration transmission member 10 is located at the rear end of the seat surface 2a. Even if the vibration transmission member 10 is disposed in the seat surface 2a in this manner, the seated person can be caused to feel an effective vibration thanks to resonance or the like, as with the vibration transmission member 10 according to embodiment.

Figure 4B:
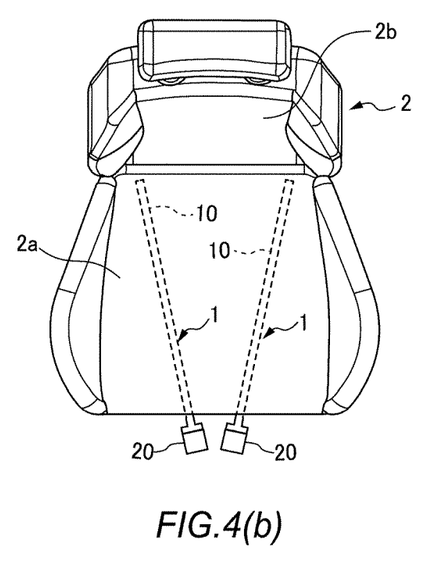

Also, as shown in FIG. 4(b), the vibration transmission member 10 may be disposed in the seat surface 2a in such a manner that the rear end thereof (the end on which the exciter 20 is mounted) is located near the center in the left-right direction of the front end of the seat surface 2a and the front end thereof is located near the left end (or near the right end) of the rear end of the seat surface 2a. Also in this case, the vibration transmission member 10 is buried in the cushion of the seat surface 2a in a state in which the exciter 20 secured to the rear end of the vibration transmission member 10 is located in front of the vehicle seat 2 and the front end of the vibration transmission member 10 is located at the rear end of the seat surface 2a. Even if the vibration transmission member 10 is disposed in the seat surface 2a in this manner, the seated person can be caused to feel an effective vibration thanks to resonance or the like, as with the vibration transmission member 10 according to the embodiment.

Figure 4C:
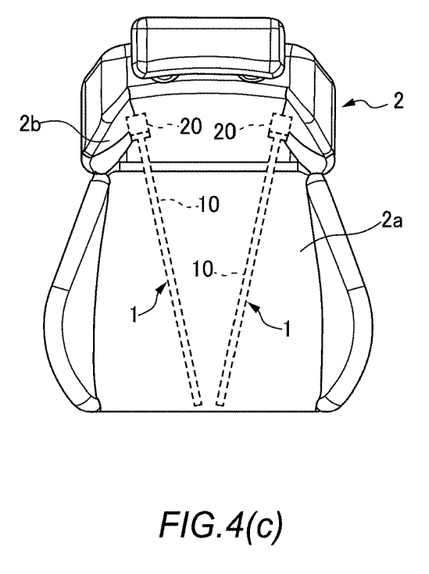

Also, as shown in FIG. 4(c), the vibration transmission member 10 may be disposed in the seat surface 2a in such a manner that the front end thereof is located near the center in the left-right direction of the front end of the seat surface 2a and the rear end thereof (the end on which the exciter 20 is mounted) is located near the left end (or near the right end) of the rear end of the seat surface 2a. In this case, the vibration transmission member 10 is buried in the cushion of the seat surface 2a in a state in which the exciter 20 secured to the rear end of the vibration transmission member 10 is located in the rear of the vehicle seat 2 and the front end of the vibration transmission member 10 is located at the front end of the seat surface 2a. Even if the vibration transmission member 10 is disposed in the seat surface 2a in this manner, the seated person can be caused to feel an effective vibration thanks to resonance or the like, as with the vibration transmission member 10 according to the embodiment.

Figure 5A:
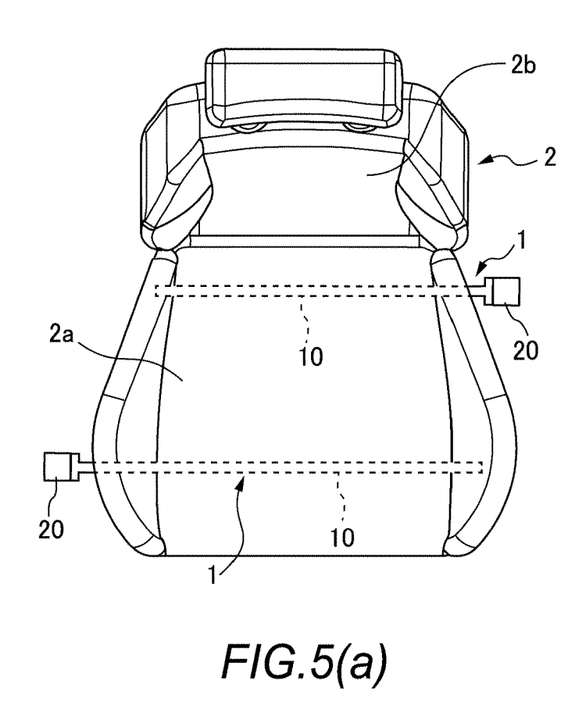
FIGS. 5(a) and 5(b) show other examples in which the vibration generator according to the embodiment is disposed in the seat surface of the vehicle seat.
Figure 5B:
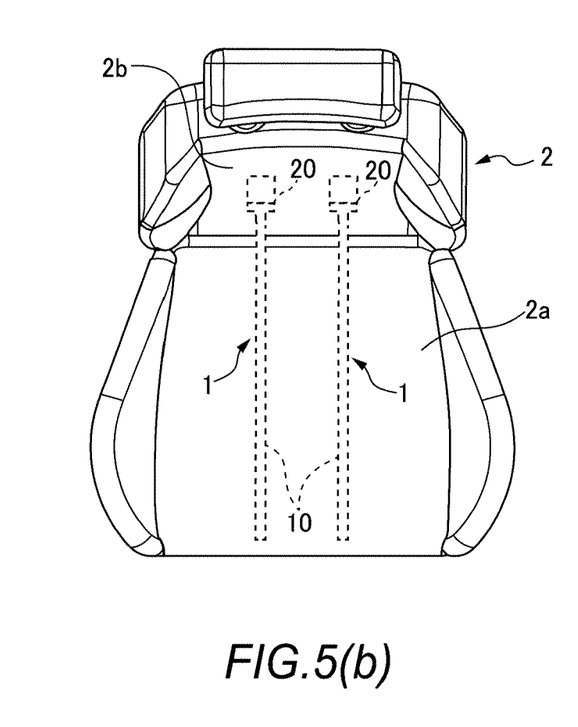

As another method, the vibration transmission member 10 may be disposed in the left-right direction of the seat surface 2a, as shown in FIG. 5(a). Also, a pair of vibration transmission members 10 extending in the front-back direction may be disposed in parallel, as shown in FIG. 5(b).

While, in the vibration generator 1 according to the embodiment, the exciter 20 is secured directly to the rear end of the vibration transmission member 10, the exciter 20 need not necessarily be secured directly to the vibration transmission member 10. The exciter 20 only has to be mounted on the vibration transmission member 10 in such a manner that the extending direction of the vibration transmission member 10 and the vibration transmission direction of the exciter 20 become the same direction. The use of such a mounting structure allows the vibration of the exciter 20 to be effectively transmitted in the extending direction of the vibration transmission member 10.

Accordingly, for example, there may be used a structure in which one end of a crank-shaped connection member is mounted on the rear end of the vibration transmission member 10 and the exciter 20 is mounted on the other end of the connection member. The term "crank-shaped" here refers to having a shape in which two right-angled narrow curves are alternately connected and the extending direction line of one end and the extending direction line of the other end are in parallel. If the vibration transmission member 10 is mounted to the exciter 20 through the crank-shaped connection member, the extending direction of the vibration transmission member 10 and the vibration transmission direction of the exciter 20 become paralleled and are directed to the same direction. For this reason, as with the vibration generator 1 according to the embodiment, the vibration of the exciter 20 can be transmitted in the extending direction of the vibration transmission member 10 unless the crank-shaped connection member contacts another member such as a seat frame. Thus, the vibration of the exciter 20 can be effectively transmitted in the extending direction of the vibration transmission member 10.

Also, an approximately S-shaped connection member having moderate curves rather than crank-shaped narrow curves may be used as long as the extending direction of the vibration transmission member 10 and the vibration transmission direction of the exciter 20 are directed to the same direction. Although the vibration generation direction of the exciter 20 and the extending direction of the vibration transmission member 10 are opposite to each other, there may be used a U-shaped connection member or the like where the vibration directions become the same horizontal direction.

Also, the vibration generator according to the present invention need not be disposed in the seat surface 2a. For example, the vibration generator 1 may be disposed in the backrest 2b.

REFERENCE SIGNS LIST 1 vibration generator
2 vehicle seat
2a seat surface (of vehicle seat)
2b backrest (of vehicle seat)
3 cushion (elastic member)
10 vibration transmission member
20 exciter
21 frame
21a leg (of frame)
22 dampers
23 outer yoke
23a sidewall (of outer yoke)
23b bottom (of outer yoke)
24 permanent magnet
25 inner yoke
26 bobbin
26a base (of bobbin)
27 voice coil
30 sound generator

The invention claimed is:

1. A vibration generator comprising:
a vibration transmission member disposed in a seat beneath a seat surface of the seat so as to extend longitudinally in a horizontal direction of the seat surface and configured to transmit a vibration in an extending direction of the vibration transmission member in which the vibration transmission member extends longitudinally; and
an exciter configured to vibrate in the extending direction and configured to transmit a vibration to the vibration transmission member in the extending direction;
wherein the exciter comprises:
a frame attached to one end of the vibration transmission member in the extending direction;
a cylindrical bobbin connected to the frame;
a voice coil wound around the cylindrical bobbin;
a permanent magnet surrounded by the cylindrical bobbin; and
a yoke supporting the permanent magnet, and
wherein the yoke is configured to approach and separate from the frame in the extending direction so that the cylindrical bobbin vibrates in the extending direction.

2. The vibration generator according to claim 1, wherein the vibration transmission member is a bar-shaped body elongated in the extending direction and is disposed beneath the seat surface in such a manner that one end of the bar-shaped body is located at one of a front end or a rear end of the seat surface and in a position close to a side in a left-right direction of the seat surface and another end of the bar-shaped body is located at an end different from the one of the front end or the rear end of the seat surface at which the one end of the bar-shaped body is located and in a position closer to a center in the left-right direction than the position close to the side of the seat surface in which the one end of the bar-shaped body is located.

3. The vibration generator according to claim 2, wherein the vibration transmission member is a cylindrical bar-shaped body having an approximately circular sectional shape and the cylindrical bar-shaped body is elongated in the extending direction.

4. The vibration generator according to claim 1, wherein the vibration transmission member is disposed in an elastic member disposed beneath the seat surface.

5. The vibration generator according to claim 1, wherein the exciter is disposed outside of the seat in the extending direction.

* * * * *